Feb. 26, 1946.   R. H. GODDARD   2,395,405
LANDING APPARATUS FOR ROCKET CRAFT
Filed Oct. 7, 1940   2 Sheets-Sheet 1
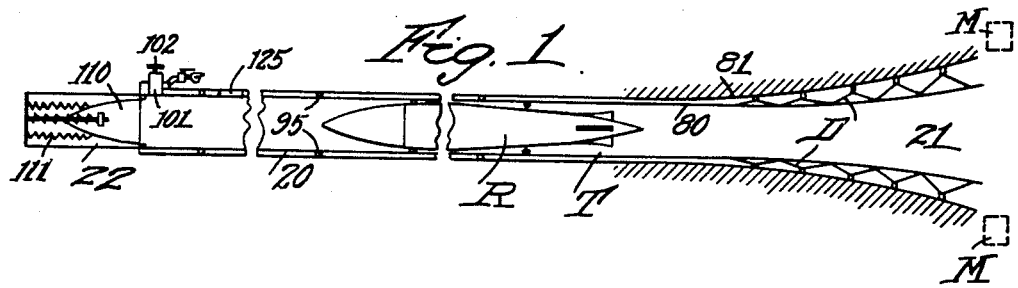
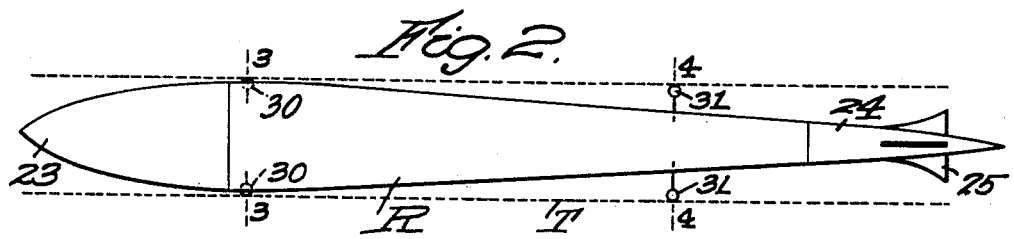
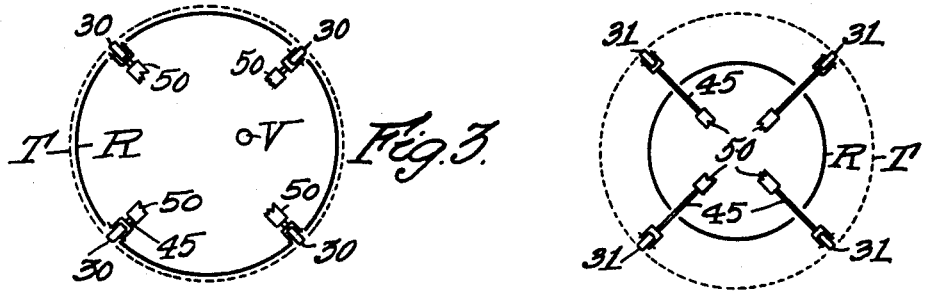
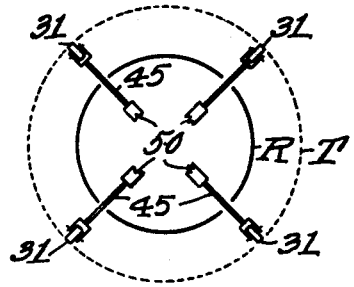
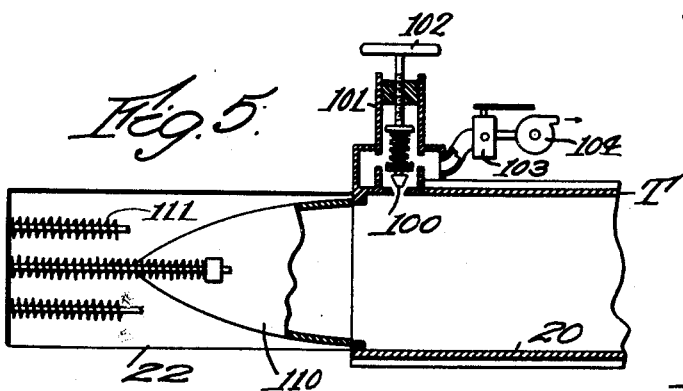
Inventor
Robert H. Goddard
By attorney Feb. 26, 1946.    R. H. GODDARD    2,395,405
LANDING APPARATUS FOR ROCKET CRAFT
Filed Oct. 7, 1940    2 Sheets-Sheet 2
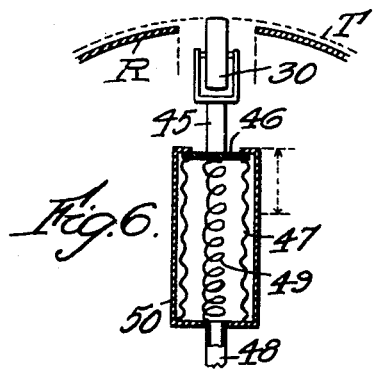
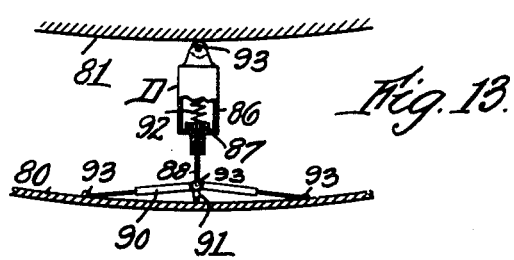
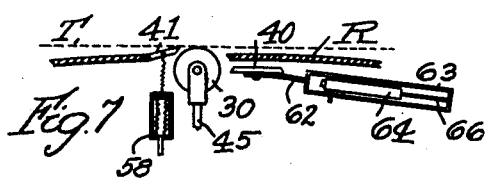
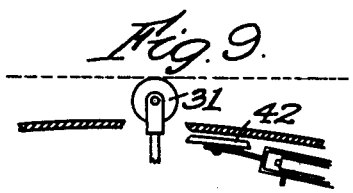
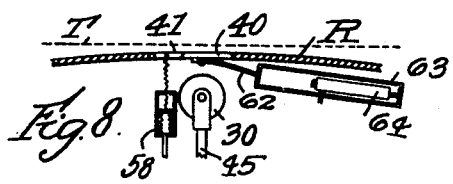
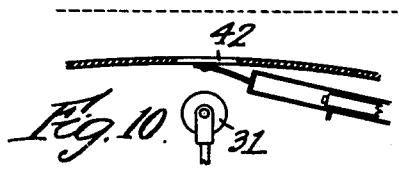
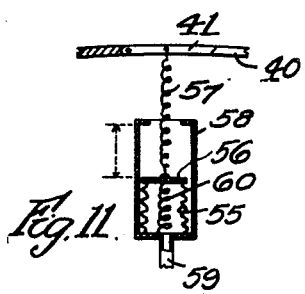
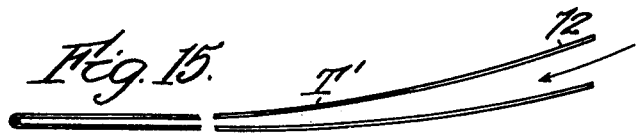
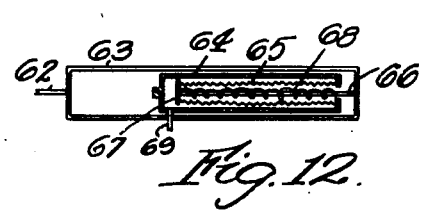
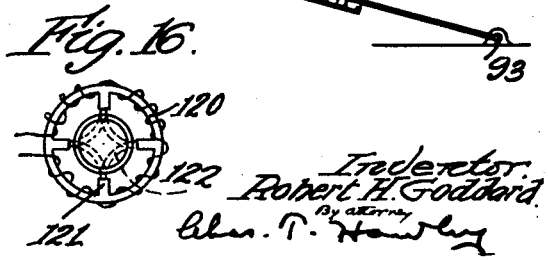

Patented Feb. 26, 1946

2,395,405

UNITED STATES PATENT OFFICE 2,395,405

LANDING APPARATUS FOR ROCKET CRAFT

Robert H. Goddard, Roswell, N. Mex., assignor of one-half to The Daniel and Florence Guggenheim Foundation, New York, N. Y., a corporation of New York Application October 7, 1940, Serial No. 360,012

14 Claims. (Cl. 244—110)

This invention relates to aircraft in which propulsion is effected by the rearward discharge of one or more rocket blasts. Such rocket craft are designed to travel at great altitudes and at very high speeds, and the safe landing of such craft presents very special problems.

It has been proposed to effect a parachute deceleration and landing of such rocket craft, and also to provide retractable wing structures which may be outwardly projected for deceleration and landing. Both of these proposals involve the use of additional parts which are heavy and bulky and which also require a considerable period of time in which to act to safely decelerate the craft. On the other hand, the utmost saving of time and weight is essential to render rocket craft efficient and satisfactory for their intended purposes.

It is the general object of my invention to provide improved means for landing a rocket craft quickly and safely and with the addition of few and relatively light extra parts to the craft.

A further object is to provide landing apparatus which permits a rocket craft to approach a landing at a higher landing speed than has been heretofore possible, thus reducing the time loss due to deceleration.

To the attainment of these general objects, I provide an elongated landing tube in which a rocket craft may be brought to rest with a pneumatic cushion effect. I may also provide an additional mechanical cushion device and magnetic means to retard the craft as it enters the landing tube.

My invention further relates to arrangements and combinations of parts which will be hereinafter described and more particularly pointed out in the appended claims.

A preferred form of the invention is shown in the drawings, in which

Fig. 1 is a longitudinal sectional elevation disclosing my invention;

Fig. 2 is an enlarged side elevation of the rocket craft;

Figs. 3 and 4 are transverse sectional views, taken along the lines 3—3 and 4—4 in Fig. 2 respectively;

Fig. 5 is an enlarged sectional elevation of the left-hand or closed end portion of the landing tube;

Fig. 6 is a sectional side view of a wheel positioning device;

Fig. 7 is a partial longitudinal sectional view showing certain closure devices;

Fig. 8 is a view similar to Fig. 7 but showing the parts in a different position;

Fig. 9 is a partial longitudinal sectional view showing additional closure devices;

Fig. 10 is a view similar to Fig. 9 but showing the parts in a different position;

Figs. 11 and 12 are enlarged sectional views of certain parts shown in Fig. 7;

Fig. 13 is a side elevation, partly in section, showing a shock-absorbing device;

Fig. 14 is an enlarged sectional view of certain parts shown in Fig. 13;

Fig. 15 shows a modified form of landing tube; and

Fig. 16 is a side elevation of a magnetic retarding device to be described.

Referring particularly to Figs. 1 to 4, my improved landing apparatus comprises a landing tube T having a substantially cylindrical portion 20, an enlarged or bell-shaped entrance portion 21, and a cushioning end portion 22.

The rocket craft R to be landed preferably has the general appearance shown in Fig. 2, with its section of greatest diameter near the forward end and substantially at the line 3—3 in said figure. Forwardly from this section line, the craft R tapers abruptly to a somewhat blunt point 23, and rearward of the line 3—3 the craft tapers gradually to a rear portion 24 in which suitable apparatus is provided to produce one or more rocket blasts. The rear portion 24 may have external vanes 25 at its rear end but these vanes do not extend outward to the greatest circumference of the craft.

In order to support the craft R as it enters and travels along within the tube T, I provide a plurality of front wheels 30 and a plurality of rear wheels 31 on the craft. In Figs. 3 and 4 I have shown four such wheels spaced 90° apart, but either more or less wheels may be provided as found desirable. This plurality of wheels distributes the stresses, so that a strong heavy structure, such as is needed to support a single landing gear of the ordinary type, is not required.

During normal operation of the aircraft, the wheels 30 and 31 are retracted as shown in Figs. 8 and 10 respectively, but when a landing is to be effected, the wheels are projected outward as indicated in Figs. 7 and 9 so as to engage the inner wall of the cylindrical portion 20 of the landing tube and with relatively slight clearance. The craft is thus guided along the cylindrical part 20 of the tube T but without sliding contact between the body of the aircraft and the inner wall of the tube.

When the wheels 30 and 31 are retracted and the craft is in flight, the openings in the rocket casing through which the wheels 30 are projected are closed by doors 40 and 41 (Fig. 8), and the openings for the wheels 31 are correspondingly closed by doors 42 (Fig. 10).

Pressure-operated devices are provided for outwardly projecting the wheels 30 and 31, and one of these devices is shown in detail in Fig. 6. Each such device comprises a wheel-supporting member 45 mounted on a plate 46 forming the movable end of a metal bellows 47 which is supplied with air under pressure through a pipe 48. A tension spring 49 within the bellows 47 normally retracts the associated wheel 30, and a casing 50 supports the bellows 47 and limits outward movement of the plate 46 and the wheel 30 supported thereby.

Relatively heavy air pressure is supplied to all of the bellows 47 when a landing is to be effected, and the wheels 30 and 31 are thus simultaneously moved outward and held very firmly in outwardly projected position. The devices for projecting the wheels 31 outward are the same as disclosed in Fig. 6, except for increased length of certain parts to provide for greater outward travel.

Pressure-operated devices are also provided for simultaneously withdrawing the doors 40 and 42 and for swinging outward the doors 41, all to the positions shown in Figs. 7 and 9. These operating devices are preferably of the pneumatic bellows type shown in detail in Figs. 11 and 12.

Fig. 11 shows one of the devices for operating the outwardly swinging doors 41. Said device comprises a metal bellows 55 having a movable end plate 56 connected by a spring 57 to a door 41. The bellows 55 is mounted in a fixed casing 58 which limits outward movement of the plate 56. The bellows 55 may be supplied with air under pressure through a pipe 59. A heavier tension spring 60 is provided within the bellows 55, which spring normally tensions the spring 57 and retracts the parts to the position shown in Figs. 8 and 11.

When pressure is applied in the bellows 55, the tension of the spring 60 is overcome and the tension spring 57 first contracts to its free length and then becomes a compression member which exerts a yielding lifting force on the door 41, moving it to the raised position shown in Fig. 7.

The doors 40 are each preferably retracted by a pneumatic device such as is shown in detail in Fig. 12. A resilient rod 62 (Figs. 8 and 12) is connected at one end to a door 40 and at the other end to a rectangular open frame 63 which embraces the fixed casing 64 of a metal bellows 65. A rod 66 connects the frame 63 to a plate 67 which forms the movable end of the bellows 65.

A compression spring 68 in the bellows 65 holds the parts normally in the position shown in Figs. 8 and 12, with the door 40 in closed position. When air is admitted through a pipe 69 to the space surrounding the bellows 65, the bellows is deflated, moving the frames 63, rod 62 and door 40 to the positions shown in Fig. 7. The resilience of the rod 62 is utilized to yieldingly press the door 40 outward in the rocket casing as it is moved to closed position.

The pneumatic devices for retracting the doors 42 are identical with the device shown in Fig. 12 and above described for the doors 40.

A valve V (Fig. 3) may be connected to the supply pipes of all of the door-operating pneumatic devices, so that all of the doors may be simultaneously operated under manual control if the aircraft is manned. If the craft is not manned, the valve V may be opened by a device operating by an increase in atmospheric density, such as is described in my prior Patent No. 1,834,149, or by other suitable automatic control devices.

It is of course necessary to direct the craft with considerable accuracy toward the landing tube, and this may be done in the usual way by an operator if the craft is manned. Otherwise some automatic directional device may be provided, which is indicated generally at M in Fig. 1. This may comprise a radio beam, remote radio control, or any other usual control device, which devices are in themselves well-known and constitute no part of the present invention. The remote control device M may also be utilized, if desired, to effect opening of the valve V as the craft approaches the landing tube T.

In order to more conveniently receive a craft approaching at a descending angle, the entrance portion of the landing tube T' may be curved upwardly as indicated at 72 in Fig. 15.

Since the wheels 30 and 31 are held practically rigid, it is desirable to provide the landing tube with a more or less flexible and yielding surface to avoid shock to the aircraft. For this purpose I form the landing tube with an inner wall 80 and an outer casing 81. The inner wall 80 is of suitable thin resilient sheet material, such as thin resilient sheet metal, while the outer casing 81 may be substantially rigid and is fixed in position.

Shock-absorbing devices D are provided in the entrance or bell portion 21 of the tube T, and these devices are preferably of increased size toward the open end of the tube as indicated in Fig. 1, because it is at the entrance that the greatest shocks will be encountered.

One of these shock-absorbing devices D is shown in Fig. 13 and comprises a casing or chamber 86 filled with a suitable liquid and having a perforated piston 87 connected by a piston rod 88 to a series of long connecting elements 90 and a central short connecting element 91. These elements 90 and 91 are attached at spaced points to the inner flexible wall 80 of the tube T. A spring 92 in the casing 86 yieldingly holds the piston in outward position. Universal joints 93 (Fig. 13) are provided between the shock absorbing connections 90 and 91 and the piston rod 88, also between the casing 86 and the outer fixed casing 81, and between the parts 90 and 91 and the inner wall 80.

When a blow is received on the adjacent portion of the inner wall 80, movement of the wall is yieldingly resisted by the spring 92 and is retarded but not prevented by the liquid in the chamber 86. Furthermore, each of the connections 90 and 91 is of similar shock-absorbing construction, so that each portion of the surface of the inner wall 80 is supported on a shock-absorbing structure comprising a main shock-absorber D and a subsidiary shock absorber 91 adapted to resist outward movement of the wall 80, and a series of subsidiary shock-absorbers 90 adapted to resist tangential movement of any portion of said wall.

In the cylindrical portion 20 of the tube T there is little if any probability of a severe blow being delivered against the inner wall 80, and the walls 80 and 81 may be spaced apart by rigid connecting members 95, instead of by the shock-absorbing devices D previously described.

The escape of air from the inner end of the tube T is controlled by a safety or relief valve 100, mounted in a valve casing 101 and adjustable by a handle 102. The valve 100 may be set to maintain any desired limit of compression in the tube T and maintains this decelerating force substantially constant.

Normally the air escapes through an open port in the three-way valve 103, but if the craft R stops before fully entering the landing tube T, it may be assisted further inward by shifting the valve 103 to connect an exhauster 104 through the valve 100 to the tube portion 20.

As the craft approaches its final inner position, the nose of the craft preferably engages a conical bumper 110 (Fig. 5), yieldingly mounted in the casing portion 22 and held in position by a plurality of cushioning springs 111. The bumper 110 is preferably of substantially the same section as the front end portion 23 of the aircraft R, so that undue pressure on any small area may be avoided.

The rearwardly opening swinging doors 41 may be utilized as catches or latches to prevent rebound or outward movement of the craft R after it has entered the tube T. These doors should be closed before removal of the craft from the tube T is attempted.

Initial deceleration of the aircraft may be accomplished by providing a series of magnetic rings 120 (Fig. 16) surrounding the entrance portion of the landing tube and having poles 121 extending substantially to the inner wall thereof. Each ring is so wound that the poles 121 are alternately positive and negative, with magnetic lines of force 122 traversing the path of the aircraft in passing from one pole to the next and thus exerting a retarding effect on the aircraft.

A plurality of such magnetic rings may be provided and the magnetic force of these rings may be increased toward the closed end of the landing tube, either by closer spacing of the rings or by creation of stronger magnetic fields. Obviously the magnetic retarding devices become more effective as the cylindrical portion 20 of the tube is approached and the clearance is correspondingly reduced.

It should be noted that the air compression means and the magnetic means do not accomplish exactly the same result. The magnetic means is most effective initially, when the speed is high and the air compression low. Toward the extreme end of the flight, the magnetic means is not so essential, as the speed is low but the air compression high.

Where the magnetic rings 120 are used, a single sliding door 40 may be substituted for each pair of doors 40 and 41 as shown herein, as the magnetic rings will prevent rebound and mechanical catches or latches will be unnecessary. One or more conveniently located doors 125 (Fig. 1) may provide exit from the craft R after it is brought to rest.

If the landing speed of the craft R is found to be excessive, a preliminary deceleration may be effected by using movable sections in the rear portion of the craft casing, as set forth in my co-pending application Serial No. 344,327, filed July 8, 1940.

The operation and utility of my improved landing apparatus will be readily apparent from the foregoing description. Deceleration during landing is effected mainly by the resistance of the air compressed in the tube T by the entering aircraft R. Additional decelerating or retarding forces may be supplied by the magnetic rings 120.

Important advantages of my invention lie in the fact that my improved landing apparatus renders it unnecessary to provide the usual heavy and bulky retractable landing gear otherwise required for aircraft; requires no heavy shock-absorbing devices on the aircraft for such gear; and at the same time, by the structure which surrounds the craft, provides shock-absorbed deceleration without the possibility of bouncing at high landing speeds.

Having thus described my invention and the advantages thereof, I do not wish to be limited to the details herein disclosed, otherwise than as set forth in the claims, but what I claim is:

1. Landing apparatus for rocket craft comprising a landing tube having an entrance portion and having a body portion substantially fitting said craft, and means for maintaining substantially uniform pressure comprising a pressure relief valve located at the inner end of said landing tube said relief valve being constructed and arranged to open in response to excessive pressure within the tube and being effective to control the escape of air from said inner end as a rocket craft enters and moves along said tube, said relief valve being also effective to limit said escaping air to a predetermined and substantially uniform maximum pressure, whereby said craft is gradually decelerated in said landing tube and excessive pressure is avoided.

2. Landing apparatus for rocket craft comprising a landing tube having an entrance portion and having a body portion substantially fitting said craft, means for maintaining substantially uniform pressure comprising a pressure relief valve located at the inner end of said landing tube said relief valve being constructed and arranged to open in response to excessive pressure within the tube and being effective to control the escape of air from said inner end as a rocket craft enters and moves along said tube, said relief valve being also effective to limit said escaping air to a predetermined and substantially uniform maximum pressure, whereby said craft is gradually decelerated in said landing tube and excessive pressure is avoided, and manual means to selectively establish said predetermined pressure.

3. Landing apparatus for rocket craft comprising a landing tube having an enlarged entrance portion and a body portion substantially fitting the outer casing of said craft at its greatest diameter and about its entire periphery, said craft including wheels thereon projectable slightly beyond said casing to have close but free rolling engagement with the inner wall of said landing tube body as said craft enters therein, means to house said wheels in said craft during flight, and means to project said wheels outward to predetermined operative positions prior to landing.

4. Landing apparatus for rocket craft comprising a landing tube having an enlarged entrance portion and a cylindrical body portion substantially fitting said craft, said craft including wheels thereon having close rolling engagement with the inner wall of said landing tube body as said craft enters therein, means to house said wheels in said craft during flight including doors to close openings in the craft through which the wheels are withdrawn, and means to open a plurality of said doors simultaneously.

5. Landing apparatus for rocket craft comprising a landing tube having an enlarged bell-shaped entrance portion and a cylindrical body portion substantially fitting said craft, said craft including wheels thereon having close rolling engagement with the inner wall of said landing tube body as said craft enters therein, means to house said wheels in said craft during flight including doors to close openings in the craft through which the wheels are withdrawn, fluid-pressure-operated means effective to open a plurality of said doors simultaneously, and spring means to close said doors.

6. Landing apparatus for rocket craft comprising a landing tube having an enlarged entrance portion and a subtantially cylindrical body portion, said craft including wheels thereon having close rolling engagement with the inner wall of said landing tube body as said craft enters therein, and fluid-pressure-operated means effective to move said wheels radially outward from said craft to operative position.

7. Landing apparatus for rocket craft comprising a landing tube having a bell-shaped entrance portion and a substantially cylindrical body portion, means to control the escape of air from said tube as a rocket craft enters therein, said craft including wheels thereon having close rolling engagement with the inner wall of said landing tube body as said craft moves along said tube, and fluid-pressure-operated means effective to move said wheels radially outward from said craft to operative position and to maintain said wheels in substantially rigid outwardly projected position.

8. Landing apparatus for rocket craft landing at a low gliding angle with the horizontal, comprising a landing tube having a widened entrance portion, the entering edge of which is substantially tangential to said gliding direction and said widened portion being gradually contracted and merging into a substantially horizontal body portion which closely fits said rocket craft, and a pressure relief valve located at the inner end of said horizontal portion and effective to control the escape of air from said inner end as a rocket craft enters and moves along said tube, and said relief valve being also effective to limit said escaping air to a predetermined and substantially uniform maximum pressure, whereby said craft is gradually decelerated in said landing tube and excessive pressure is avoided.

9. Landing apparatus for rocket craft comprising a landing tube having an enlarged entrance portion and an elongated body portion substantially fitting said craft, and said entrance portion having a rigid outer wall and a flexible inner wall concentric with and mounted within said outer wall and slightly yieldable relative thereto.

10. Landing apparatus for rocket craft comprising a landing tube having an enlarged entrance portion and an elongated body portion substantially fitting said craft, and said entrance portion having a rigid outer wall, a flexible inner wall concentric with and mounted within said outer wall and slightly yieldable relative thereto, and damping and shock-absorbing devices mounted between said walls.

11. Landing apparatus for rocket craft comprising a landing tube having an enlarged entrance portion and an elongated body portion substantially fitting said craft, and said entrance portion having a rigid outer wall, a flexible inner wall concentric with and mounted within said outer wall and slightly yieldable relative thereto, and damping and shock-absorbing devices mounted between said walls and of increased resistance toward the open outer end thereof.

12. Landing apparatus for rocket craft comprising a landing tube having an enlarged entrance portion and an elongated body portion substantially fitting the casing of said craft, means to uniformly decelerate said craft in said body portion, a plurality of doors in said casing pivoted thereto at their forward ends and extending rearward from said pivots, and means to yieldingly force said doors outward to engage the inner surface of said landing tube and to prevent rebound of said craft in said tube.

13. Landing apparatus for rocket craft comprising a landing tube having an enlarged entrance portion and a substantially cylindrical body portion, said craft including wheels thereon having close rolling engagement with the inner wall of said landing tube body as said craft enters therein, means to house said wheels in said craft during flight including doors to close openings in said craft through which the wheels are withdrawn, means to open said doors, and pneumatic means to decelerate said craft in the body portion of said tube, and certain of said doors being effective when open to prevent rebound of said craft in said tube.

14. Landing apparatus for rocket craft comprising a landing tube having an enlarged entrance portion and a substantially cylindrical body portion, means to maintain constant pressure for the air escaping from said tube as a rocket craft comes to rest therein, and additional means to exhaust air from said tube to effect further inward movement of a partially entered craft therein.

ROBERT H. GODDARD.